United States Patent
Rajasingam

(10) Patent No.: US 8,572,845 B2
(45) Date of Patent: Nov. 5, 2013

(54) METHOD FOR MANUFACTURING WIND TURBINE BLADES USING A MOULD SYSTEM

(75) Inventor: Damien Rajasingam, East Cowes (GB)

(73) Assignee: Vestas Wind Systems A/S, Aarhus N (DK)

( * ) Notice: Subject to any disclaimer, the term of this patent is extended or adjusted under 35 U.S.C. 154(b) by 176 days.

(21) Appl. No.: 12/892,330

(22) Filed: Sep. 28, 2010

(65) Prior Publication Data

US 2011/0073237 A1 Mar. 31, 2011

Related U.S. Application Data

(60) Provisional application No. 61/246,700, filed on Sep. 29, 2009.

(30) Foreign Application Priority Data

Sep. 29, 2009 (DK) ................... 2009 70133

(51) Int. Cl.
- *B23P 15/02* (2006.01)
- *B29C 35/00* (2006.01)
- *B29C 33/22* (2006.01)
- *B29C 33/26* (2006.01)
- *B28B 1/087* (2006.01)

(52) U.S. Cl.
USPC .......... 29/889.7; 425/406; 425/442; 249/139; 249/120

(58) Field of Classification Search
USPC ................. 29/889.7; 264/239, 257, 319, 324; 425/409, 442; 249/139, 120
See application file for complete search history.

(56) References Cited

U.S. PATENT DOCUMENTS

| | | | | |
|---|---|---|---|---|
| 3,147,324 A | * | 9/1964 | Ward | 264/254 |
| 4,337,026 A | * | 6/1982 | Taubenmann et al. | 425/454 |
| 7,223,091 B2 | * | 5/2007 | Olsen et al. | 425/450.1 |
| 2008/0277834 A1 | * | 11/2008 | Schibsbye | 264/334 |

FOREIGN PATENT DOCUMENTS

| | | |
|---|---|---|
| DE | 202 18 776 | 4/2003 |
| DK | 2000 01281 | 3/2002 |
| DK | 2002 00306 | 11/2002 |
| EP | 1 562 733 | 2/2008 |

OTHER PUBLICATIONS

Dmitri Burdykin: 1st Technical Examination Report issued in priority Denmark Patent Application No. PA 2009 70133; May 10, 2010; 4 pages; Denmark Patent and Trademark Office.

* cited by examiner

*Primary Examiner* — Sarang Afzali
(74) *Attorney, Agent, or Firm* — Wood, Herron & Evans, LLP

(57) ABSTRACT

A mold system for manufacturing wind turbine blades includes two mold halves shaped for molding respective mold halves. A first mold is supported by a hinge system which is capable of moving the mold from a first position wherein the mold faces upwards to a position wherein the first mold faces the second mold. A final linear displacement of the first mold is carried out by actuators which may be integrated with the first or the second mold. The actuators are engaged with the hinge system so that the first mold is displaceable or the hinge system holding the first mold is displaceable. In both alternatives the actuators merely transfer the load of the first mold to a support via the hinge system.

12 Claims, 8 Drawing Sheets

METHOD FOR MANUFACTURING WIND TURBINE BLADES USING A MOULD SYSTEM

CROSS-REFERENCE TO RELATED APPLICATIONS

This application claims priority under 35 U.S.C. §119(a) to Danish Patent Application No. PA 2009 70133, filed Sep. 29, 2009. This application also claims the benefit of U.S. Provisional Application Ser. No. 61/246,700, filed Sep. 29, 2009. Each of the applications is incorporated by reference herein in its entirety.

TECHNICAL FIELD

The invention relates to manufacturing of wind turbine blades, and in particular to a mould system for the manufacturing.

BACKGROUND

Manufacturing of a wind turbine blade may be performed by initially fabricating two elongated halves of the blade and subsequently joining the halves together.

The process of bringing the halves together so that they can be joined is very requiring due to the weight and large dimensions of the blades combined with small tolerances of the positioning of the blades.

Safety requirement is another challenge with respect to the design of the mould manufacturing equipment. Thus, the manufacturing equipment must satisfy certain safety requirements so that the workers are not exposed to injuries.

Accordingly it is a problem to design mould systems which satisfies requirements to handle heavy loads within small tolerances and yet satisfy safety requirements.

DK200001281 and DK200200306 discloses a device for installation on and closure of a two-part mould used to produce a closed profile body, particularly a windmill vane of fibre-reinforced plastic. It comprises hinge components located in a hinge line running parallel with the two mould parts, so that they can be rotated in relation to each other between a first open position in which the two mould parts are open and a second partly closed position in which the openings of the mould parts face each other. The device has displacement components for straight-line or curved-line translatory movement of the two mould parts between their second partly closed position and a third position where their inner surfaces determine the shape of the profile body. Drive components are provided for executing rotary movement around the hinge lines.

The performance of the displacement components for straight-line or curved-line translatory movement mould parts in DK200001281 and DK200200306 may not be sufficient, for example, with respect accuracy of the movement and safety requirements. Accordingly, improvements for manufacturing of wind turbine blades are desirable.

EP 1 562 733 discloses a mould assembly including a first mould part and a second mould part for moulding a substantially elongated, closed profile member, in particular a wind turbine blade of fibre-reinforced polymer, the mould assembly including a hinge mechanism with a hinge line extending parallel to the two mould parts in the longitudinal direction of the mould to allow turning of the mould parts in relation to each other between an open position and a closed position. The mould assembly includes displacement means for a rectilinear translational movement of the second mould part between a partially closed position and a completely closed position. The displacement means are formed of guide rods including drive means for displacing the guide rods and thus for moving the two mould parts between the partially closed and completely closed positions.

Whereas EP 1 562 733 discloses a mould for manufacturing of wind turbines, EP 1 562 733 does not satisfactorily meet safety requirements due to the exposed guide rods for moving the two mould parts between the partially closed and completely closed positions. Accordingly, it is an object of the present invention to improve mould systems with respect the above mentioned problems and other problems.

SUMMARY

In general, the invention preferably seeks to mitigate, alleviate or eliminate one or more of the above mentioned disadvantages of mould systems. In particular, various embodiments of the present invention provide mould systems and methods that solve one or more of the above mentioned problems with respect to safety, accurate operation and general handling, or other problems, of the prior art.

To better address one or more of these concerns, in a first aspect of the invention a mould system for manufacturing a wind turbine blade from two blade halves is presented. The mould system comprises:

a first moveable mould and a second stationary mould, where the first and second moulds comprise mould surfaces shaped according to the respective first and second halves of the blade, a hinge unit comprising a rotatably hinged arm connected to the first mould for rotating the first mould about a hinge axis so as to bring the first mould from an initial position to an intermediate position where the mould surface of the first mould substantially faces the mould surface of the second mould, one or more actuators engageable with the first mould and the hinge unit for translating the first mould relative to the hinge unit and the intermediate position, where the one or more actuators are engaged so as to enable the one or more actuators to transfer at least a fraction of the weight of the first mould to the hinge unit, where the one or more actuators are aligned with a centre of gravity of a load comprising the weight of the first mould when the first mould is in the intermediate position, and where the one or more actuators are aligned so as to compensate torque loads on the one or more actuators about an axis parallel or substantially parallel with the hinge axis.

Arranging the one or more actuators to transfer at least a fraction of the weight of the first mould to the hinge unit, i.e., merely by inserting the one or more actuators between the first mould and the hinge unit, may be an advantage since the actuators may be arranged to follow the motion of the first mould from the initial position to the final position. Accordingly, the first mould may not need to be disengaged from the hinge system in order to carry out the final translation to the final position.

In order to minimise the load, particularly the torque load, on the one or more actuators, it may be an advantage to align the actuators with the respect to the centre of gravity of the load carried by the actuators, i.e., primarily the centre of gravity of the first mould. It is understood that the centre of gravity is located in a plane or a slab of the mould substantially perpendicular to the hinge axis or the longitudinal axis of the first mould and that the one or more actuators are located in the plane or close to the plane.

In this way, when a single actuator is used to carry the weight of the first mould, or rather a fraction of the weight of the first mould when a plurality of hinge units are used, the single actuator may advantageously be aligned approximately vertically above or below (in the direction of gravity) the centre of gravity so that torque loads on the actuator, at least in the direction of the hinge axis, are reduced or eliminated.

Similarly, when two or more actuators are used to carry the weight of the first mould or a fraction of the weight of the first mould, the actuators may advantageously be aligned with respect to the centre of gravity so that so that torque loads on the actuator, at least in the direction of the hinge axis, are reduced or eliminated. The alignment of two actuators may be achieved by locating the actuators on either side of the centre of gravity in a plane comprising the centre of gravity by distributing the actuators in a direction approximately perpendicular to the hinge axis.

In general, actuators may be aligned with the centre of gravity so as to compensate torque loads on the one or more actuators by balancing the load carried by the one ore more actuators relative to the support points where the actuators engage with the load. That is, the one or more actuators' support points should be chosen so that load does not rotate relative to the one or more support points and preferably so that the weight of the load is uniformly distributed on the one or more supports points.

It is understood that the one or more actuators are aligned with respect to the centre of gravity opposite the hinge unit to which the one or more actuators are engaged. Further, it is understood that a torque load in a direction of the hinge axis means a force acting to rotate an object about the hinge axis. The hinge unit may be fixed to a stationary support, e.g., a floor.

It is understood that the one or more actuators of a single hinge unit are arranged to transfer at least a fraction of the weight. That is when a plurality of hinge units are used, the weight of the first mould is divided between the plurality of hinge units and, consequently, between the one or more actuators.

A second aspect sharing the same inventive concept as the first aspect relates to a mould system for manufacturing a wind turbine blade from two blade halves, the system comprising:

a first moveable mould and a second stationary mould, where the first and second moulds comprise mould surfaces shaped according to the respective first and second halves of the blade, a hinge unit comprising a rotatably hinged arm connected to the first mould for rotating the first mould about a hinge axis so as to bring the first mould from an initial position to an intermediate position where the mould surface of the first mould substantially faces the mould surface of the second mould, one or more actuators engageable with the hinge unit and a stationary support structure for translating the first mould and the hinge unit relative to the intermediate position, where the one or more actuators are engaged so as to enable the one or more actuators to carry at least a fraction of the weight of the first mould and the hinge unit.

Arranging the one or more actuators to carry or transfer at least a fraction of the weight of the first mould and the hinge unit., i.e., merely by inserting the one or more actuators between the first mould and the stationary support structure, may be an advantage since the actuators may be arranged to be engageable with the hinge unit during the motion of the first mould from the initial position to the final position.

Accordingly, the first mould may not need to be disengaged from the hinge system in order to carry out the final translation to the final position since the one or more actuators are arranged to translate both the hinge unit and the first mould simultaneously. Accordingly, the first mould may be permanently connected to the hinge unit.

Accordingly, both the first and second aspects of mould systems are arranged to transfer the load of the first mould to some stationary support, either via the hinge unit by arranging the actuator to transfer the load from the mould to the hinge unit as in the first aspect, or by arranging the actuator to carry the weight of both the mould and the hinge unit to the support as in the second aspect. Therefore, the first and second aspects share the common inventive concept of transferring the weight of the via the hinge unit, either by interfacing the actuators between the hinge unit and the first mould or by arranging the actuators to translate both the first mould and the hinge unit.

In an embodiment of the invention the one or more actuators are aligned with a centre of gravity of a load comprising the weight of the first mould when the first mould is in the intermediate position, where the one or more actuators are aligned so as to compensate torque loads on the one ore more actuators about an axis parallel or substantially parallel with the hinge axis.

In an embodiment of the invention, the mould system comprises a single actuator which is aligned with the centre of gravity of the load by locating the single actuator vertically below or above the centre of gravity. In this embodiment and other embodiments vertically below or above should not be understood in a mathematically strict sense, i.e., deviations of the actuator placement of some centimetres in a direction away from the vertical line are generally allowed. By locating the single actuator close to the centre of gravity, torque loads on the actuator is reduced.

In an embodiment of the invention, the mould system comprises two actuators distributed in a direction perpendicular or substantially perpendicular to the hinge axis or the longitudinal direction of the first mould, where two of the actuators are located on either side of the centre of gravity when the first mould is in the intermediate position. When two or more actuators are used they need not be located vertically below the centre of gravity, but may be located on either side of the centre of gravity. That is, on a line extending through the hinge unit to which the actuators are engaged and being perpendicular to the hinge axis or the longitudinal direction of the first mould, at least two of the actuators may advantageously be located on either side of the centre of gravity to reduce torque load on the actuators.

In an embodiment each actuator comprises a first part and a second part, where the first part is engageable via an engagement means with the hinge unit and the second part is connected with the first mould, or the first part is engageable via an engagement means with the first mould and the second part is connected with the hinge unit.

The first part of the actuator may be constituted by a stationary part, e.g., a cylinder of a hydraulic actuator and the second part may be constituted by the displaceable part, e.g., the displaceable piston of the actuator or oppositely, the second part of the actuator may be constituted by the stationary part and the first part may be constituted by the displaceable part. Thus, as an example, the first part may be engageable, for example, loosely, slideably or rotatably connected, either with the hinge unit or the upper mould. The other part of the actuator may be connected, for example, via a rotatable or fixed connection to the first mould.

The first part or the second part may advantageously be engageably connected, for example, via a loose engagement slot which allows one part of the actuator to displace relative to the engagement means so as to enable inclined translations of the first mould and in general to enable the position of actuators relative to first mould to adapt any constrained translation of the first mould.

In a similar but alternative embodiment each actuator comprises a first part engageable via an engagement means with the hinge unit, and a second part connected with the fixed support structure for transferring at least a fraction of the weight of the first mould and the hinge unit to the support. Accordingly, when the one or more actuators are connected between a fixed support and the hinge unit, one part of the actuator may advantageously be connected, for example, rotatably connected to the support, whereas the other part may be loosely engageable with the hinge unit to enable the hinge unit to translate in an angled direction. Thus, one end of the actuator may be able to displace and adapt to any constrained translation of the first mould, and the other end of the actuator is able to rotate, for example, according to the displacement of the opposite end of the actuators.

In an embodiment the engagement means enables a positional degree of freedom of the one or more actuators relative to the engagement means. Thus, the engagement means may enable the actuator to displace in a horizontal direction perpendicular to the longitudinal direction of moulds or the hinge axis due to the positional degree of freedom. This may advantageously enable inclined translations of the first moveable mould relative to the second stationary mould and in general allow the actuators to adapt to any constrained motion of the first mould.

In an embodiment, the one or more actuators are configured to linearly displace the first mould in the same direction as a displaceable part of the one or more actuators. When inclined translations of the first mould are not required, the first mould may advantageously be translated in the same direction as the displaceable part by an actuator—this may result in a more simple system. In this case, loose engagement means may not be required, but both the first and second parts of an actuator may be permanently connected to the respective counterparts of the hinge unit, the first mould and the stationary support.

In an embodiment, the mould system comprises at least one guiding means for constraining the direction of translation of the first mould. The guiding means may advantageously be used for controlling the translation of the first mould in linear or curved translations. Further, the guiding means may advantageously limit rotation of the first mould about an axis parallel with the longitudinal axis of the first mould and, thereby, prevent actuators being exposed to torque loads due to any rotation of the first mould. Thus, if the one or more actuators are not perfectly aligned with respect to the centre of gravity, the guiding means may ensure that actuators are not or substantially not exposed to torque loads.

In an embodiment, the direction of displacement determined by the at least one guiding means is different than the displacement direction of the one or more actuators. Thus, the actuators may advantageously be oriented so that the displaceable part of the actuators is displaceable in an arbitrary direction, for example, the direction of gravity. However, by engaging the actuator by use of loose engagement means or sliding connections, any displacement of the first mould in a direction other than the actuator's displacement directions, for example, a horizontal direction, is still possible even though the actuator's displacement direction is constrained in a different direction.

In an embodiment, the one or more actuators are enclosed within the outer boundaries of the first mould or the second mould. Due to the arrangement of the actuators relative to the hinge unit, the actuators may be hidden within the boundaries of the first mould or the second mould so that no moving part is accessible. This may improve safety conditions of the mould system.

An embodiment of the mould system comprises a plurality of the hinge units and a plurality of actuator systems each comprising the one or more actuators, where the hinge unit and actuator systems are distributed along a longitudinal direction of the elongated mould and where each actuator system is aligned with the centre of gravity for each hinge unit.

A third aspect of the invention relates to a method for manufacturing a wind turbine blade from two blade halves using a mould system comprising a first moveable mould and a second stationary mould with mould surfaces shaped according to the respective first and second halves of the blade, and comprising a hinge unit with a rotatably hinged arm connected to the first mould, the method comprising, rotating the first mould about a hinge axis of the hinge arm from an initial position to an intermediate position where the mould surface of the first mould substantially faces the mould surface of the second mould, subsequent to rotating the first mould about the hinge axis, translating the first mould relative to the intermediate position using one or more actuators engaged with the hinge unit so that the hinge unit carries at least a fraction of the weight of the first mould at least during an initial period of the translation, where the one or more actuators are aligned with a centre of gravity of a load comprising the weight of the first mould when the first mould is in the intermediate position, and where the one or more actuators are aligned so as to compensate torque loads on the one or more actuators about an axis parallel or substantially parallel with the hinge axis.

It is understood that the hinge unit carries at least a fraction of the weight of the first mould at least during an initial period of the translation since in the final period of the translation the first mould may be supported by contact to the second mould. Further, it is understood that when a plurality of hinge units are used to carry the weight of the first mould, each hinge unit carries a fraction of the weight of the first mould since the weight is divided among the hinge units.

A fourth aspect of the invention relates to a method for manufacturing a wind turbine blade from two blade halves using a mould system comprising a first moveable mould and a second stationary mould with mould surfaces shaped according to the respective first and second halves of the blade, and comprising a hinge unit with a rotatably hinged arm connected to the first mould, the method comprising, rotating the first mould about a hinge axis of the hinge arm from an initial position to an intermediate position where the mould surface of the first mould substantially faces the mould surface of the second mould, subsequent to rotating the first mould about the hinge axis, translating the first mould and the hinge unit simultaneously relative to the intermediate position using one or more actuators engaged with the hinge unit, where the one or more actuators are aligned with a centre of gravity of a load comprising the weight of the first mould when the first mould is in the intermediate position, and where the one or more actuators are aligned so as to compensate torque loads on the one or more actuators about an axis parallel or substantially parallel with the hinge axis.

Translating the first mould and the hinge unit simultaneously implies that the one or more actuators carry a least a fraction of the weight of first mould and the hinge unit at least during an initial period of the translation.

In an embodiment, each of the one or more actuators is rotated together with the first mould about the hinge axis during the movement from the initial position to the intermediate position. Since the actuators are rotated with the mould, the actuators may advantageously be enclosed by outer boundaries of the first mould.

In an embodiment, the one or more actuators are loaded by the weight of the first mould during rotating the first mould about a hinge axis from the initial position to the intermediate position. Thus, the one or more actuators may be arranged to carry the weight of the first mould during the rotation. Alternatively, the first mould may be locked to the hinge unit during rotation so as to avoid loading of the actuators during the rotation of the first mould about the hinge axis.

In general, the various aspects of the invention may be combined and coupled in any way possible within the scope of the invention. These and other aspects, features and/or advantages of the invention will be apparent from and elucidated with reference to the embodiments described hereinafter.

In summary the invention relates to a mould system for the manufacturing of wind turbine blades. The mould system includes two mould halves shaped for moulding respective mould halves. A first mould is supported by hinge units which are capable of moving the mould from a first position where the mould faces upwards to a position where the first mould faces the second mould. A final linear or curved displacement the first mould is carried out by actuators which may be integrated with the first or the second mould. The actuators are engaged with the hinge units so that the first mould is displaceable or the hinge system holding the first mould is displaceable. In both alternatives the actuators merely transfer the load of the first mould to a support, for example, a floor, via the hinge unit.

BRIEF DESCRIPTION OF THE DRAWINGS

Embodiments of the invention will be described, by way of example only, with reference to the drawings, in which.

DETAILED DESCRIPTION

Figure 1:
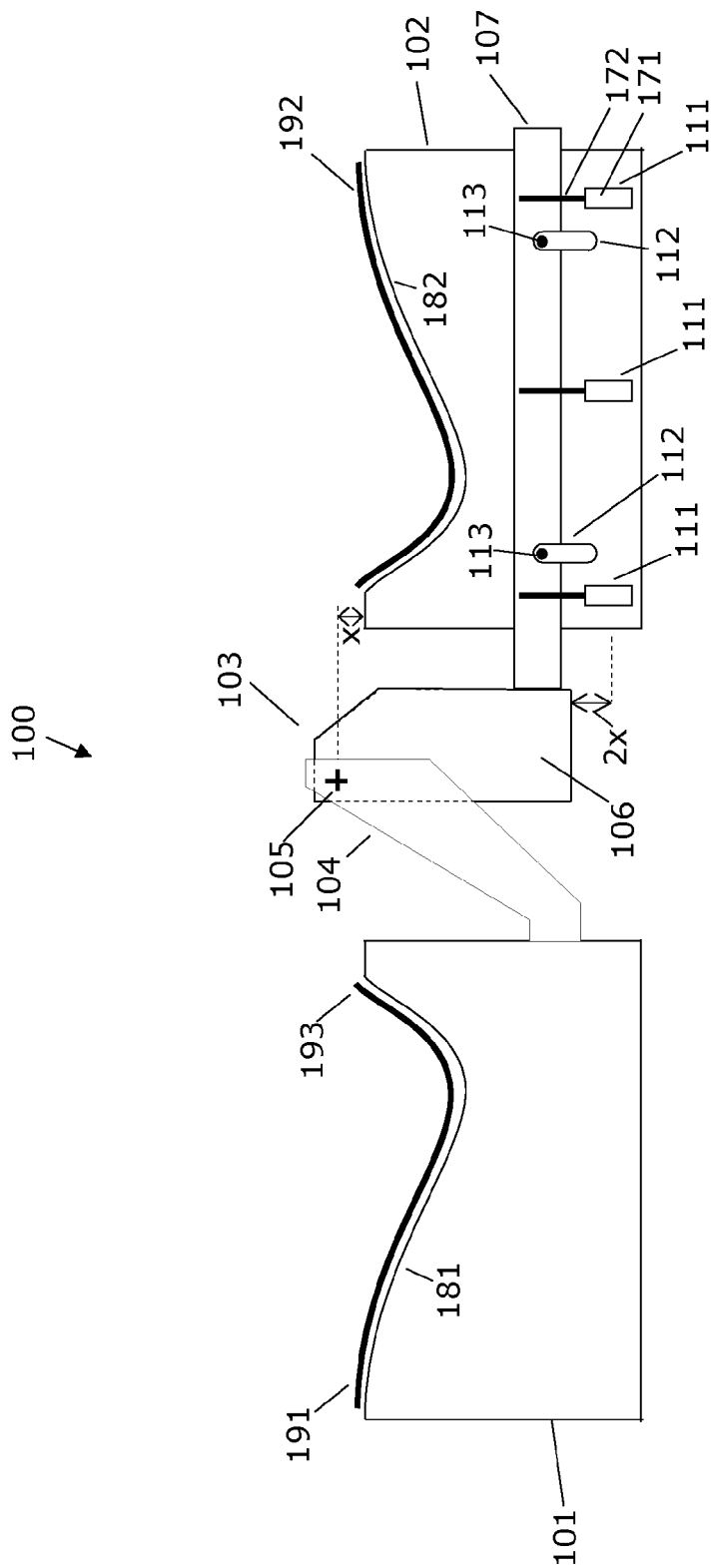
FIG. 1 shows a cross sectional view of the mould system configured in an initial position with both mould openings facing upwards and with actuators configured to translate the left mould and the hinge unit.

FIG. 1 shows a mould system 100 comprising a first moveable mould 101, and a second stationary mould 102. The moulds have concavely shaped cavities with mould surfaces 181, 182 shaped according to respective first and second blade halves to be joined together to form a blade for the rotor of a wind turbine generator.

The mould system 100 is used for the manufacturing of blades for wind turbine generators. The manufacturing includes moulding blade halves 191, 192 by layering glass- or carbon fibre material with adhesives on the respective mould surfaces 181, 182 and, subsequently, curing the composite material by heating the mould surfaces. The hardened blade halves 191, 192 are assembled by bringing the two blade halves together so that the concave surfaces of the blades faces and by bringing the edges 193 of the first blade half in a position where the are in contact with—or just slightly separated from—the edges of the opposite blade half. The edges 193 of opposite blade halves are joined, for example by gluing together contacting opposite edges 193.

The mould system 100 further comprises a hinge unit 103 comprising a hinge body 106 and a hinge arm 104 rotatably connected to the hinge body 106 via a rotatable connection which defines a single hinge axis 105. The first mould 101 is connected to the hinge arm 104 so that the first mould can be displaced along a circular trajectory about the single hinge axis 105. Alternatively, the first mould 101 and the hinge arm 104 can be formed as an integral unit.

In an embodiment of the invention, the hinge unit 103 is engageable with one or more displacement actuators 111. The actuators may be hydraulic actuators, having an actuator body 171 and a piston 172 displaceable relative to the actuator body. The actuator body 171 may be a hydraulic cylinder in which the piston is displaceable according to a pressurised fluid which can be pumped into the cylinder. The hinge unit 103 may engage with the actuators 111 via a support arm 107 fixed to the hinge body 106.

Normally the moulds 101,102 are very long, for example 50 meter, 70 meter or even longer. Therefore, it may be beneficial to use a plurality of hinge units 103, each comprising one or more actuators 111, distributed along the longitudinal direction of the mould so as to divide the load of moulds to a number of hinge units.

The one or more displacement actuators 111 are engageable with the hinge unit 103 for linearly displacing the hinge unit 103 and, consequently, the first mould 101 connected to the hinge unit. The actuators 111 may be engageable with the hinge unit 103, for example, via end portions of the pistons 172, in such a way that the actuators 111 are in permanent engagement with the hinge unit 103 or in such a way that actuators 111 are in engagement with the hinge unit 103 during a part of the linear displacement and are able to disengage from the hinge unit after a certain amount of linear displacement, for example, when the first mould has been brought into a final position relative to the second mould, for example, where the first mould is distanced a certain distance from the lower mould so as to enable joining of the blade edges 193.

The stationary actuator part, for example, the actuator body 171, may be engageable with, or connected to a stationary support structure. The stationary support structure may be stationary with respect the second mould 102 or the support may be fixed to the second mould 102. Accordingly, the stationary support may be constituted by a floor, the second mould 102 or other structure which is stationary or fixed relative to the second mould 102.

Accordingly, the mould system in FIG. 1 is able to displace the hinge unit 103 and the first mould 101 by use of actuators 111 arranged to transfer the load of the hinge system and first mould to a support.

The mould system 100 may be provided with guiding means 112,113 for constraining the linear displacement carried out by the actuators 111, i.e., controlling the direction of displacement. The guiding means may be constituted by an elongated slot 112 formed, for example, in a vertical side of the second mould and a pin 113 protruding, for example, from the support arm 107 of the hinge system 103 and slideably arranged in the slot 112.

As shown in FIG. 1, the hinge axis 105 may be located a distance x above an upper surface of the second mould, and a lower surface of the hinge system 103 may be provided with a clearance of 2x for enabling a total linear displacement of the first mould 101 of 2x.

In FIG. 1, the first mould is located in an initial position next to the second mould where the mould surfaces 181, 182 are accessible from above so that the blade halves 191, 192 can be prepared. Thus, in the initial position 181, 182 both openings of the concave shaped mould cavities formed by mould surfaces 181, 182 faces upwards.

Figure 2A:
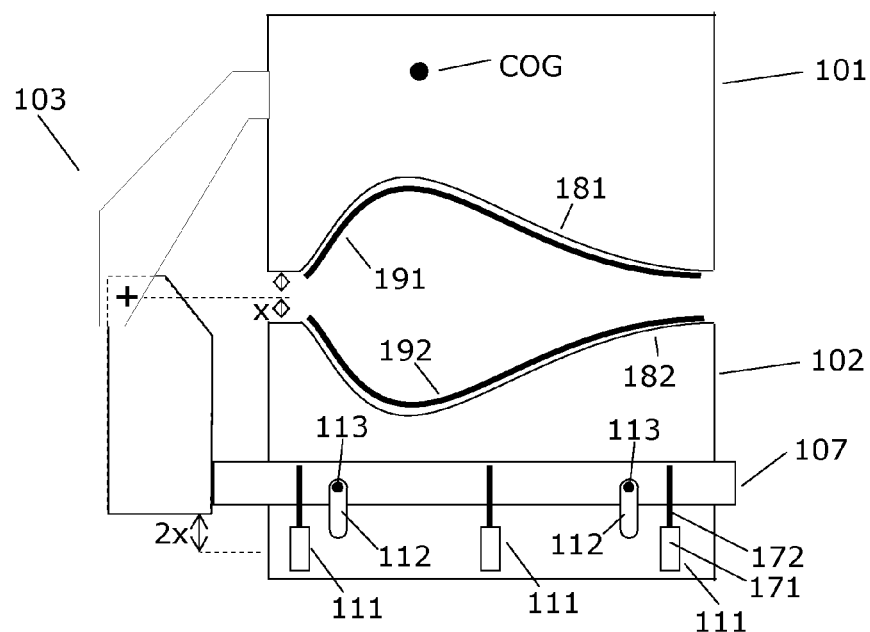
FIGS. 2A-B shows cross sectional views of the mould system shown in FIG. 1 and configured in an intermediate position and a final position, respectively, for illustration of the final translation of the upper mould.

FIG. 2A shows the mould system of FIG. 1 in a state after the first mould has been rotated approximately 180 degrees clockwise about the hinge axis 105 to an intermediate position where the mould surface 181 of the first mould 101 substantially faces the mould surface 182 of the second mould 102. Thus, in the intermediate position the opening of the mould cavity of the first mould faces downwards relative to the upward facing opening of the mould cavity of the second mould. The first mould 101 is separated from the second mould 102 with a distance (2x) twice the vertical separation (x) of the hinge axis 105 and the upper surface of the second mould 102 or the first mould 101.

Figure 2B:
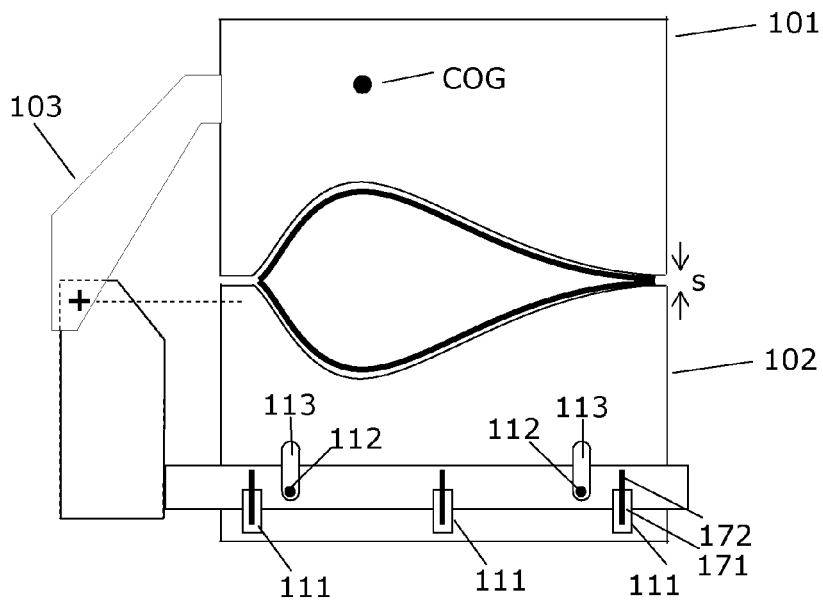

FIG. 2B shows the mould system of FIG. 2A in a state after the first mould 101 has been linearly displaced from the intermediate position towards the second mould 102. The linear displacement is performed by the one or more linear actuators 111. Thus, during the rotation of the first mould 101 about the hinge axis from the initial to the intermediate position, the actuators 111 carry the weight of the first mould and the hinge system and during this rotation the hinge system 103 and the first mould 101 is lifted by the actuators 111 to ensure a certain clearance of the hinge system, for example, a clearance of 2x, for enabling the first mould 101 to be lowered linearly towards the second mould 102 after the first mould has been brought to the intermediate position. As shown in FIG. 2B, the pistons 172 have been lowered and the pins 113 have moved downwards from an upper position to a lower position in the elongated slots 112 so as to linearly displace the first mould 101 to a final position.

Even though the translation of the first mould 101 has been described as a linear displacement from the intermediate position to the final position, it is understood that the translation need not be strictly linear since at certain points or sections along the path the translation may be curved. It is also possible the first mould may be rotated simultaneously with the linear or curved translations. As an example, the entire translation path or part of the translation path may be curved. Such curved translations may be obtained, for example, by use of curved guiding slots 112 and by engaging the actuators so that they are allowed to displace or rotate as required by the curved guiding slots 112.

The upper first mould 101 may be linearly displaced until a final position where the first mould 101 makes contact with the lower second mould 102, or until the first mould 101 is separated from the second mould 102 by a given distance s. The separation s may be selected such that the edges 193 of the first and second blade halves contact or are slightly separated. When the final position has been reached, the blade halves 191 and 192 can be joined, for example, by gluing the contacting or slightly separated blade edges 193.

FIGS. 2A and 2B show that two of the displacement actuators 111 are located on either side of the centre of gravity COG of the load carried by the actuators when the first mould is in the intermediate position or the final position. The load carried by the actuators comprises the load of the first mould, the load of the hinge unit 103 and possibly other loads. Accordingly, the centre of gravity COG comprises at least the load of the first mould. That is, the centre of gravity COG is determined not only by the first mould, but also the blade half 191, the hinge unit 103 and possibly other structures. Normally, the weight of the first mould 103 is considerably larger than weights of other load and, therefore, the centre of gravity COG is primarily determined by the first mould 101.

By placing displacement actuators 111 on either side of the centre of gravity COG, or even symmetrically with respect to the centre of gravity, so that the displacement actuators 111 are distributed along a line perpendicular to or substantially perpendicular to the hinge axis 105 in a way so that the centre of gravity is located between at least two of the actuators 111, then the torque load on the actuators are reduced since the torque or moment acting on the actuators is compensated, i.e., reduced or eliminated. That is, if only one actuator were used and located between the COG and the hinge axis 105, this would generate a torque acting on the actuator with a magnitude determined by the equivalent mass of the COG and the distance between the COG and the actuator.

Accordingly, it is understood that actuators 111 are aligned with the centre of gravity COG for one, more or all of the hinge units 103, so as to reduce, eliminate or compensate torque loads on the actuators about an axis parallel or substantially parallel with the hinge axis 105.

Whereas it may be preferable to use two or more displacement actuators, the use of only one displacement actuator 111 for each hinge unit 103 is also possible. In this case the single displacement actuator could be centred with respect to the centre of gravity COG and the torque load on the actuator could be reduced for example by guiding means 112,113 which constrains any angular rotation of the load carried by the single displacement actuator. Accordingly, an actuator system could be seen as an equivalent to an actuator 111, which actuator system in addition to the actuator 111 also comprises some system to take the torque load, for example, some guiding system for constraining rotation of the supported second mould 102. Accordingly, an actuator system may be comprised by one or more actuators 111 and guiding means 112,113 or other guiding structures.

In general, whether a single actuator 111 or a plurality of actuators 111 are used, the one actuator 111 or plurality of actuators 111 are aligned with respect to the centre of gravity COG so as to compensate torque loads on the actuators or the actuator system about an axis parallel or substantially parallel with the hinge axis.

Thus, a single actuator 111 may be aligned by locating the single actuator vertically below the centre of gravity COG (in the direction of gravity) in a plane perpendicular or substantially perpendicular to the longitudinal direction of the moulds 101,102 or the hinge axis 105, which plane comprises the centre of gravity COG. Clearly, the single actuator 111 need not be located exactly below the centre of gravity COG, i.e., it need not be located exactly on a line parallel with the direction of gravity and extending through the COG, but may be displaced from the line, preferably less than one third of the transverse dimension of the mould 101, preferably less than 50 cm from or more preferred less than 10 cm from the line.

A plurality of actuators 111 may be a aligned by distributing at least two of the actuators in a plane perpendicular or substantially perpendicular to the longitudinal direction of the moulds 101,102 or the hinge axis 105, which plane comprises the centre of gravity COG so that at the least two actuators are located on either side of the centre of gravity COG in a vertical direction perpendicular or substantially perpendicular to the longitudinal direction of the moulds 101,102. For example, two actuators 111 may be located symmetrically on either side of the centre of gravity, i.e., equally distanced from the centre of gravity, so as to minimize torque loads on each actuator 111 as much as possible.

The plurality of actuators 111 may be distributed along a line perpendicular or substantially perpendicular to the hinge axis 105 and parallel with the plane which comprised the centre of gravity COG, so that at least two of the actuators are located on either side of the centre of gravity COG (with the viewing direction perpendicular to said plane). Clearly, two of the actuators are located on the line whereas further actuators need not be on line with other actuators.

Using these principles, the one or more actuators 111 are aligned with the centre of gravity COG so as to compensate torque loads on the actuator system about an axis parallel or substantially parallel with the hinge axis, by locating the one or more actuators relative to the centre of gravity in a plane perpendicular or substantially perpendicular to the longitudinal direction of the moulds 101,102 or the hinge axis 105, which plane comprises the centre of gravity COG.

It should be noted that the relative placement between the one or more actuators 111 and the centre of gravity COG of at least the first mould varies during rotation from the initial position to the intermediate position. However, since the actuators 111 may only be activated between the final and intermediate positions, it is most important that the one or more actuators 111 are aligned with respect to the centre of gravity when the first mould is in the intermediate position.

It is understood that the one or more actuators 111 need not be distributed in a plane exactly perpendicular to the longitudinal axis of the mould or the hinge axis 105, by may be distributed in a plane having an angle to the longitudinal axis of the mould or the hinge axis 105, such as an angle less the 30 degrees, preferably less than 20 degrees or more preferred less than 10 degrees.

Figure 3A:
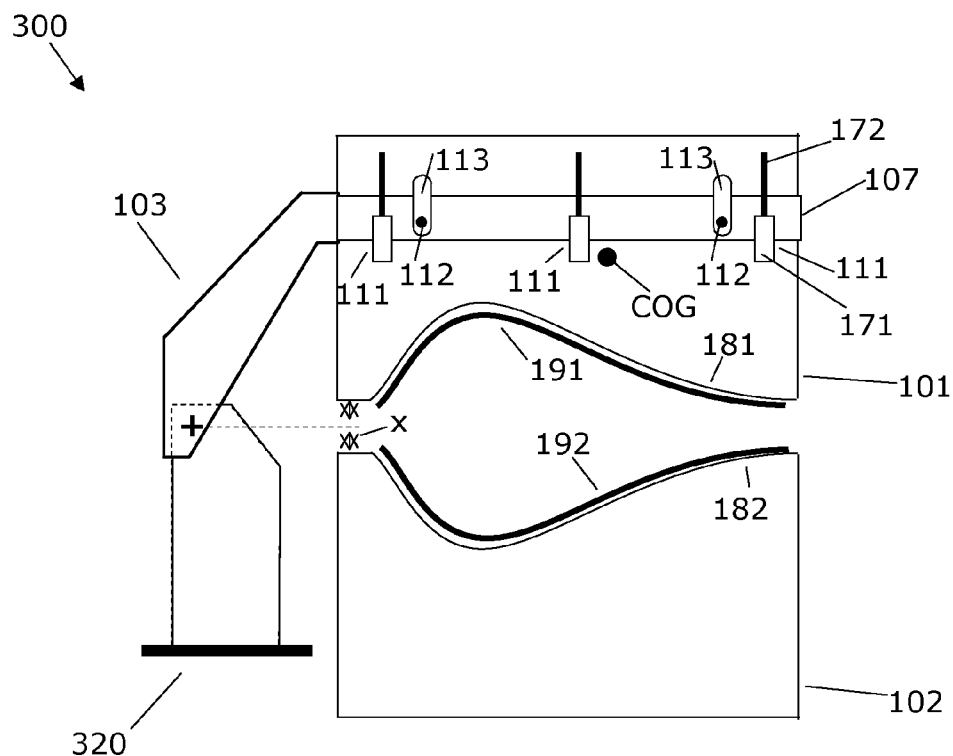
FIGS. 3A-B shows cross sectional views of a similar mould system and configured in an intermediate position and a final position, respectively, where this mould system differs from the mould system of FIG. 1 by having actuators configured to translate only the upper mould.

FIG. 3A shows a mould system 300 corresponding to the mould system shown in FIGS. 1, 2A and 2B. Accordingly, the mould system 300 may be assembled from substantially the same components as the mould system 100, and merely differs by the arrangement of the components. Accordingly, for elements in FIG. 3A corresponding to or having the same reference signs as elements in FIG. 1, the description from FIG. 1 applies equally and, therefore, a detailed description of those elements will be omitted for FIG. 3A and other corresponding mould systems described herein.

FIG. 3A shows the mould system 300 in a state where the first mould 101 has been rotated from the initial position to the intermediate position corresponding to FIG. 2A. In FIG. 3A, the one or more displacement actuators 111 are engageable with the first mould 103 and the hinge unit 103 for linearly displacing the first mould 101 relative to the hinge unit and the intermediate position.

The actuators 111 may be engageable with the first mould 101, for example, via end portions of the pistons 172, in such a way that the actuators 111 are permanently connected with the first mould 101 or in such a way that actuators 111 are connected with the first mould 101 during a part of the linear displacement and are able to disengage from the first mould 101 after a certain amount of linear displacement, for example, when the first mould has been brought into the final position relative to the second mould 102.

The stationary actuator part, for example, the actuator body 171, may be engageable with, or connected to the hinge unit 103, for example, via a support arm 307 integrated with or connected to the hinge unit 103. Alternatively, the stationary actuator part 171 may be engageable with, or connected to the first mould 101 and the displaceable actuator part 172 may be engageable with, or connected to the hinge unit 103 for linearly displacing the first mould 101.

Thus, the actuators 111 are arranged relative to first mould 101 and the hinge unit 103 so as to lower or raise the first mould 101 relative the hinge unit 103.

The hinge unit 103 may be fixed to a hinge unit support 320 such as a floor, the second mould 102, or other stationary structure.

Accordingly, the mould system in FIG. 3A is able to displace the first mould 101 by use of actuators 111 arranged to transfer the load of the first mould 101 to the hinge unit 103 and from the hinge unit to the hinge unit support 320.

Similarly to the mould system 100, the mould system 300 may be provided with guiding means 112,113 which may be constituted by an elongated slot 112 formed, for example, in a vertical side of the first mould and a pin 113 protruding, for example, from the support arm 307 and slideably arranged in the slot 112.

Figure 3B:
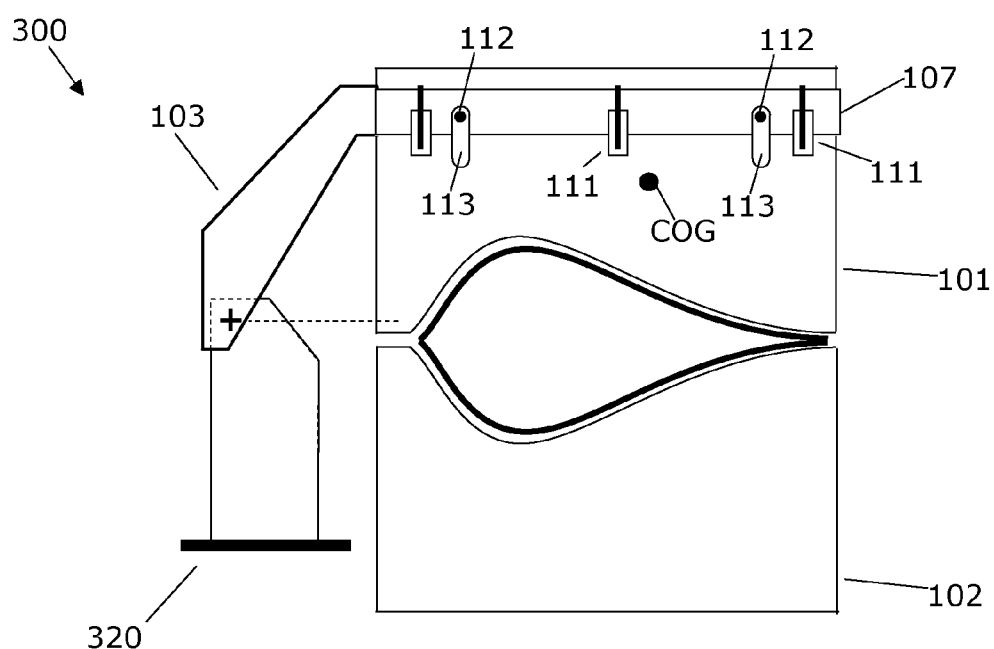

FIG. 3B shows the mould system of FIG. 3A in a state after the first mould 101 has been linearly displaced from the intermediate position towards the second mould 102. Thus, in FIG. 3B the pistons 172 have been lowered and the pins 113 have been displaced from a lower position to an upper position in the elongated slots 112.

During the rotation of the first mould 101 about the hinge axis 105 the actuators 111 of the mould system 300 may carry the weight of the first mould. Alternatively, during the rotation from the initial position to the intermediate position the first mould 101 may be in locked engagement with the hinge arm 307 so that the displacement actuators 111 are not loaded during rotation.

In FIGS. 3A and 3B two of the displacement actuators 111 may be located on either side of the centre of gravity COG of the load carried by the actuators when the first mould 101 is in the intermediate position or the final position. This way of placing the actuators reduces the torque load on the actuators. The load carried by the actuators comprises the load of the first mould. Alternatively, a single displacement actuator 111 may be used to displace the first mould, possibly in combination with guiding means for reducing the torque load on the one actuator.

Thus, the general method for linearly displacing the first mould of both mould systems 100 and 300 are common in the sense that in both systems the load of the first mould 101 is transferred to some support, either via the hinge unit 103 by arranging the one or more actuators 111 to transfer the load from the first mould 101 to the hinge unit 103, or by arranging the one or more actuators 111 to carry the weight of both the first mould 101 and the hinge unit 103.

Since the actuators 111 may be engaged between the support arm 107 and the first mould 101, or between the support arm 107 and the second mould 102, it is possible to integrate the actuators 111 and the guiding means 112,113 within the first mould 101 or the second mould 102 so that any moving part does not protrude out. In other words it is possible to place one or more of the actuators 111 so that they are enclosed within the outer boundaries of the first mould 101 or the second mould 102.

In analogy with the embodiment of FIGS. 1, 2A and 2B, the centre of gravity COG in FIGS. 3A and 3B is determined not only by the first mould 101, but also by the blade half 191 and possibly other structures. However, the centre of gravity COG in the embodiment of FIGS. 3A and 3B is not influenced by the hinge unit 103 since the actuators 111 are merely inserted between the hinge unit 103 and the first mould 101.

Similar to the embodiment of FIGS. 1, 2A and 2B, in the embodiment of FIGS. 3A-3B a single actuator 111 or a plurality of actuators 111 are preferably aligned with respect to the centre of gravity COG so as to compensate torque loads on the actuators.

Even though FIG. 3A illustrates three actuators 111, use of a single actuator 111 for each hinge unit 103 may be sufficient according to the principles of the embodiment of FIGS. 1, 2A and 2B. Thus, the single actuator 111 may be aligned with the centre of gravity COG by locating the single actuator vertically below or above the centre of gravity COG (in the direction of gravity) in a plane perpendicular or substantially perpendicular to the longitudinal direction of the moulds 101, 102 or the hinge axis 105, which plane comprises said centre of gravity COG.

Alternatively, a plurality of actuators 111 may be used for each hinge unit 103, where the actuators 111 are aligned by distributing at least two of the actuators relative to the centre of gravity so as to reduce torque loads on the actuators 111 or part of an actuator system as explained for the embodiment of FIGS. 1, 2A and 3B.

Also the embodiment in FIGS. 3A-3B is characterised in that the translation of the first mould 101 by the actuators 111 need not be a linear translation, but may also be a curved translation as explained for the embodiment of FIGS. 1, 2A and 2B.

Figure 4:
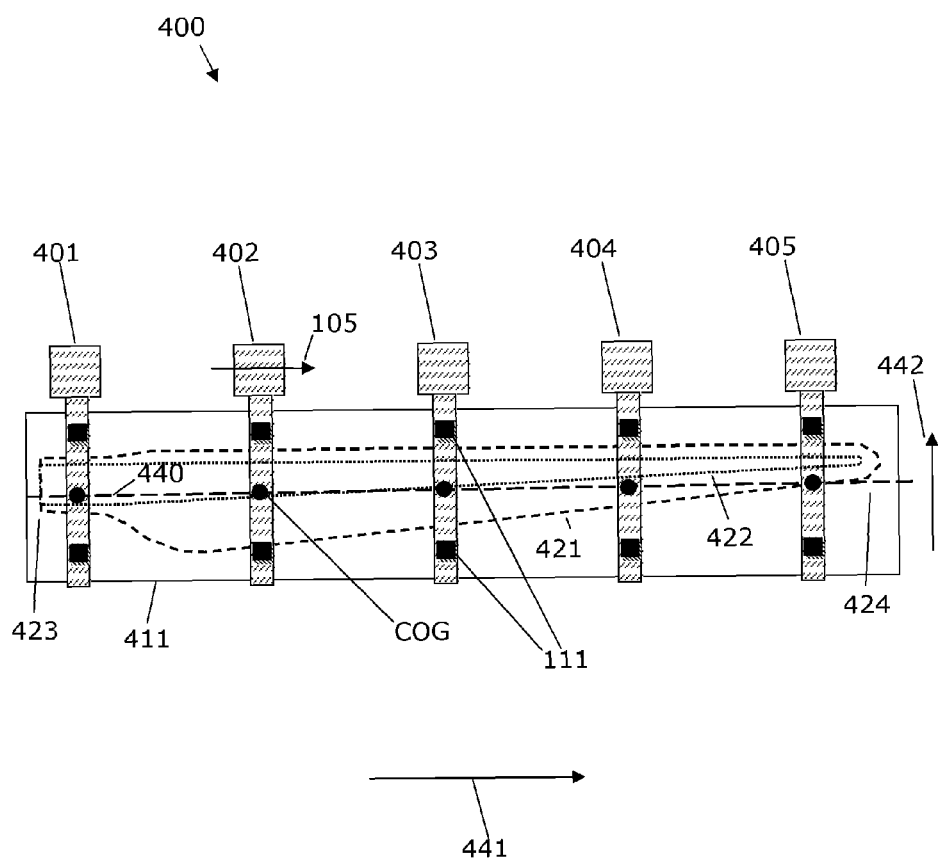
FIG. 4 shows a top view of the mould system for illustrating the distribution of hinge units and associated actuators and centres of gravities along the longitudinal direction of the moulds.

FIG. 4 shows a mould system 400 seen from above in an intermediate or final position with the first mould 411 located above the second lower mould (not shown). The contour of the mould surface 181, 421 of the first mould 411 is shown together with the spar 422. The spar 422 is located between the two blade halves and serves to increase the strength of the blade after the blade halves have been joined and glued onto the spar 422. A plurality of hinge units 401-405 are distributed along the longitudinal direction 441 of the elongated first mould 411 and the second mould from the root 423 end to the tip end 424.

FIG. 4 also shows points of centre of gravities COG. The centre of gravity COG may be understood as the centre of gravity of a slab of the first mould 101 perpendicular to the longitudinal direction 441. Accordingly, the continuous line 440 illustrates the centres of gravities COG along the first mould 101.

FIG. 4 shows that two actuators 111 are aligned with respect to the centre of gravity COG for each hinge unit 103, and that the actuators 111 are distributed in a vertical direction 442 substantially perpendicular to longitudinal direction or the direction of the hinge axis 105 for each hinge unit. The hinge axes 105 of the hinge units 103 defines a collinear line 105 extending in longitudinal direction and parallel or substantially parallel with the longitudinal direction 441.

Figure 5A:
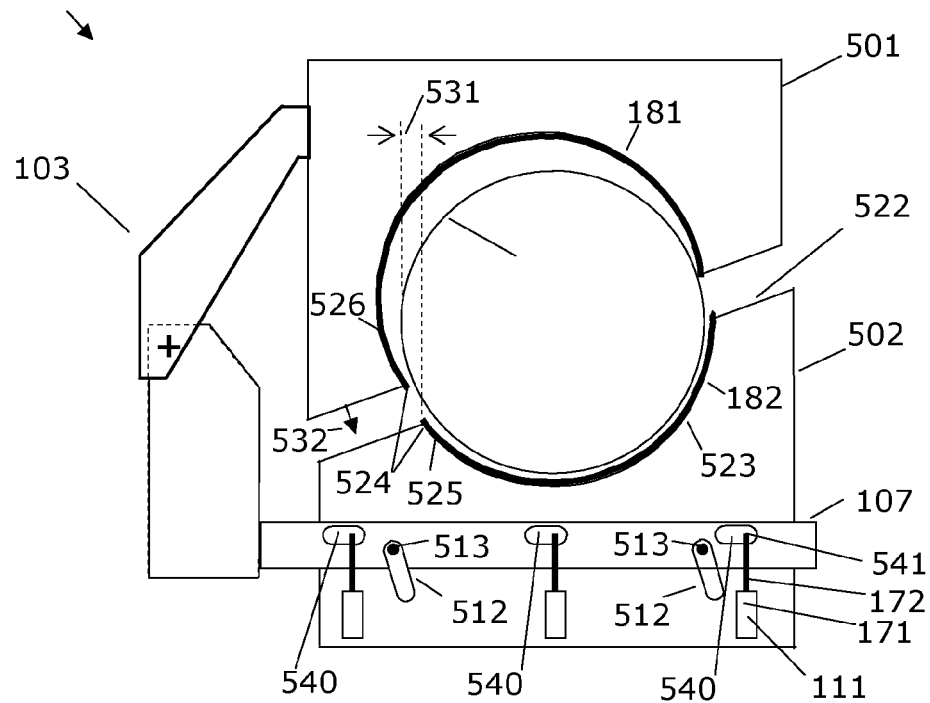
FIGS. 5A-B shows the translation of the upper mould in a mould system configured to translate the upper mould in an inclined direction relative the gravity direction, and with actuators configured according to the principle of FIG. 1.

FIG. 5A shows a mould system 500 with actuators 111 arranged to carry and displace the load of both the first mould 501 and the hinge unit 103. The hinge unit 103 is located in the root end 423 of the wind turbine blade, for example, the hinge unit 103 could be the hinge unit 401 shown in FIG. 4. Due to the twisting of the wind turbine blade, the first mould 501 and the second mould 502 of a root-end hinge unit 103 have an angled mould interface 522, whereas moulds halves of a hinge unit 103 located at the tip end 424, such as hinge unit 405, may have a horizontal mould interface 522.

Due to the spar 521,422 which protrudes horizontally 531 beyond the mould surface 182,523 and, therefore, beyond the edges 193,524 of the blade halves 525,526 to be joined, it is not possible to bring the first mould to the final position by simply displacing the first mould 501 vertically. Instead the first mould 501 needs to be linearly displaced in an angled direction 532 in order to disengage from the spar 521. The angled displacement of the first mould 101 may be obtained by angled guiding means 512 for constraining the direction of displacement of the first mould according to the required direction. The guiding means 512 for constraining the direction of displacement along in a particular angle may be obtained by a pin 513 being displaceable in an elongated slot 512 which has a direction parallel with the intended angled displacement direction 532 of the first mould 501. The angled guiding means 512 may be arranged relative to a support arm 107 of the hinge unit 103 and the first or second moulds similarly to the guiding means 112,113 of FIG. 1 and FIG. 3A.

The actuators 111 may be angled in the same direction as the angled guiding means 512,513, for example, so that the pistons of the actuators are displaceable parallel with angled guiding means 512,513. Alternatively, the displacement direction of the actuators 111 may be different than the direction of displacement determined by the guiding means. Thus, as shown in FIG. 5A a first part 172 (e.g., a piston) of the actuator 111 can be slideably arranged in an engagement means 540 such as a slot formed in the support arm 107 of the hinge unit 103. The engagement means 540 enables the first part 172 of the actuator 111 to displace linearly in a vertical direction at the same time as the first mould 501 displaces in an angled direction (relative to the vertical direction) since an end part 501 (e.g., a bearing) of the actuator 111 is able to displace or slide in a horizontal direction (relative to the vertical direction).

Figure 5B:
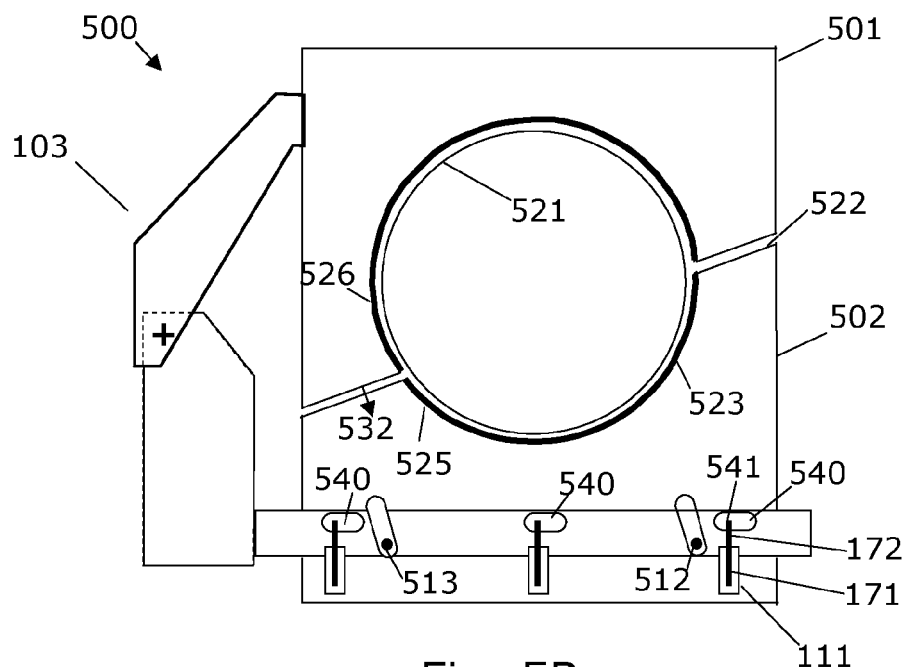

FIG. 5B shows the first mould 501 after it has been displaced from the intermediate position in angled direction 532 to the final position in FIG. 5B.

A hinge unit located at a tip end of a first mould 101, such as the hinge unit 405 in FIG. 4, may not be required to displace the first mould 101 in an angled direction 532, but may be configured to displace the mould 101 vertically, substantially in the direction of gravity, since the wind turbine blade is not twisted or only slightly twisted at the tip end. Thus, at least some of the hinge units 405 may have actuators 111 configured to linearly displace the first mould 101, 411 in the same direction as the displaceable part 172 of the actuators, generally in the direction of gravity.

Figure 6:
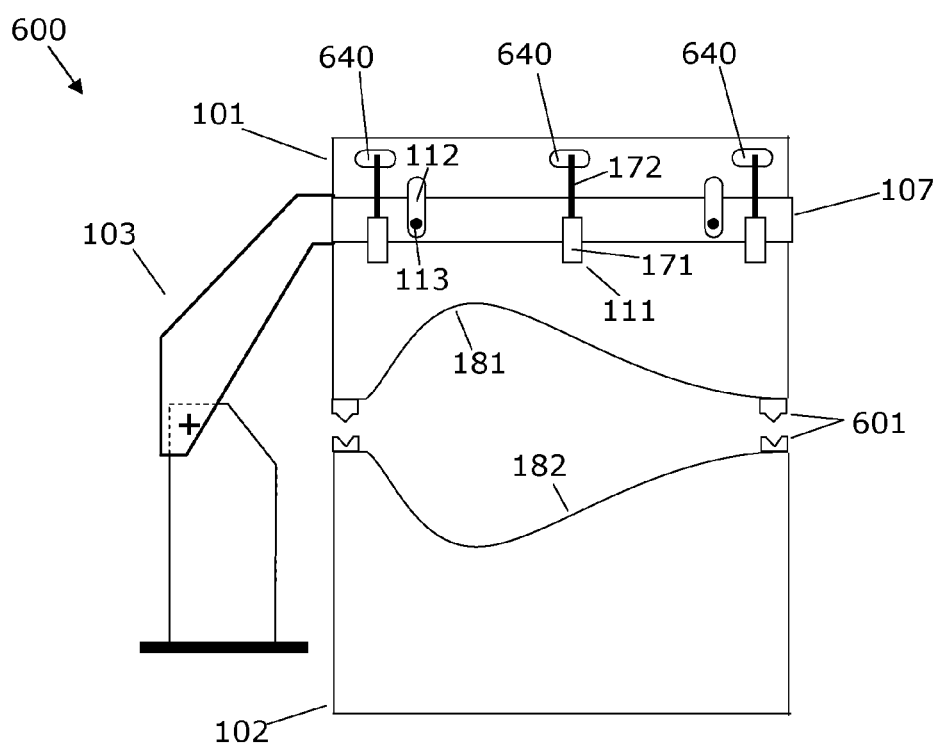
FIG. 6 shows the mould system provided with guiding pins and loose engagement means for improved positioning accuracy.

FIG. 6 shows a mould system 600 where the first and second moulds 101,102 are provided with locator pins 601 to ensure accurate positioning of the first mould 101 relative to the second mould 102. Since the locator pins 601 are provided for controlling the positioning of the first mould 101, the actuators 111 may be engaged via engagement means 640 to the first mould 101, where the engagement means 640 has sufficient clearance to allow the first mould to displace relative to the actuators 111 according to the positional guiding of the locator pins 601. Accordingly, the engagement means 640 may be configured to provide a positional degree of freedom of the actuator 111 relative to the engagement means 640 to allow the first mould 101 to displace in the direction of the degree of freedom as dictated by the locator pins 601.

Thus, as shown in FIG. 6, the first part 172 of the actuator 111 is engageable via the loose engagement means 640 with the first mould 101 and the second part 171 is connected with the hinge unit 103 via the support arm 107. The connection between the second part 171 and the hinge unit 103 may be a rotatable connection or a fixed connection. The same positional degree of freedom of the first mould 101 can be achieved by alternatively making the first part 172 of the actuator 111 fixed or rotatably connected to the first mould 101 and the second part 171 being engageable via the engagement means 640 to the hinge unit 103.

Even though a positional degree of freedom of the first mould is required, it may not be necessary to apply loose engagement means 640 to provide a positional degree of freedom. Thus, both the first and second part 171,172 of the actuator 111 may be connected, for example, rotatably connected without use of any loose engagement means. In general, any required clearance necessary to allow displacement of the first mould in any direction (other than the linear displacement direction) may be provided by other means than engagement connectors 640. In another alternative, both the first and second part 171,172 of the actuator 111 may be engaged via a loose engagement means 640.

The possible configurations of the engagement means 640 which are configured to provide a loose connection or positional degrees of freedom in one or more linear directions, applies equally to the engagement means 540 as described in connection with FIG. 5A. Thus, equivalently to the embodiment of FIG. 6, the actuators 111 may comprise a first part 172 engageable via a loose engagement means 540 to the hinge unit, and a second part 171 connected, for example, rotatably connected, to a support for carrying the load of the first mould and the hinge unit.

Engagement means 540, 640 for enabling positional degrees of freedom, may be used in connection with locator pins 601, angled guiding means 512 and in general to ensure accurate alignment of the moulds.

In an embodiment parts of the actuators 111 are not required to be displaceable in a direction different from the displacement direction of the actuators 111 and, therefore, both parts of the actuators 111 may be engaged via fixed or rotatable engagement means 540, 640.

Figure 7A:
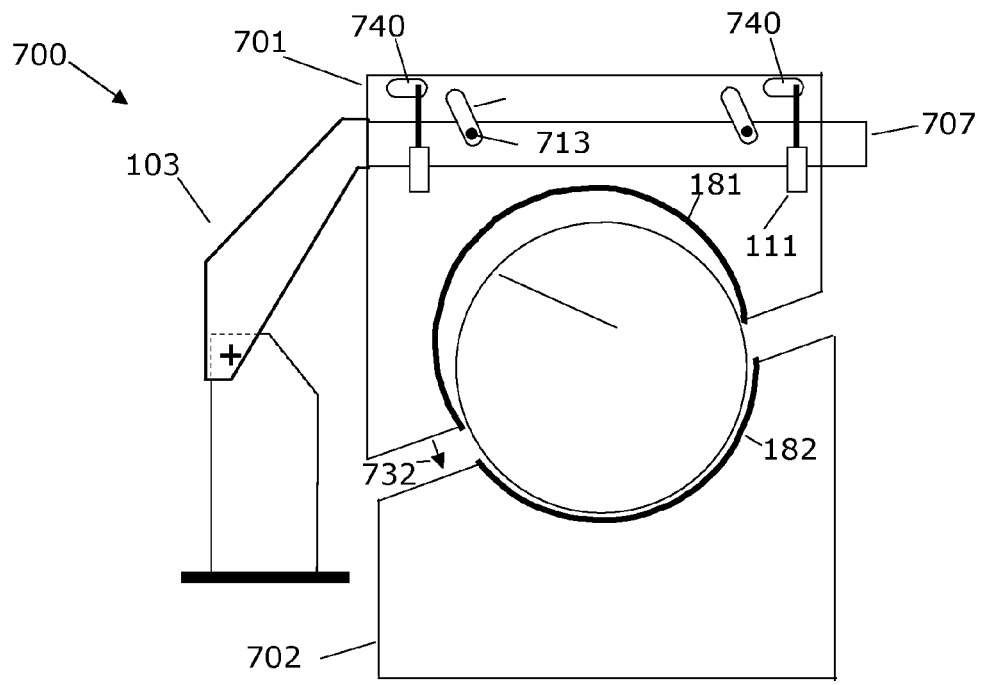
FIGS. 7A-B shows the translation of the upper mould in a mould system configured to translate the upper mould in an inclined direction relative the gravity direction and with actuators configured according to the principle of FIGS. 3A-B.

FIG. 7A shows a mould system 700 with actuators 111 arranged to carry and displace the load of both the first mould 501. The mould system comprises loose engagement means 740 which are equivalent to engagement means 640 of FIG. 6A and inclined guiding means 712, 713 corresponding to the inclined guiding means 512,513 of FIG. 5A, except that the guiding means 712, 713 are located in the top mould 701. Accordingly, by means of the inclined guiding means 712, 713 and the loose engagement slots 740, the mould system 700 possesses capabilities equivalent to the mould system 500 of FIG. 5 with respect to inclined displacement of the upper mould 701 which enables the upper mould to disengage from the spar 521 located in the lower mould 702.

Thus, the linear actuators 111, which are slideably arranged in the horizontally elongated loose engagement slots 740, are able to displace the top mould 701 in an inclined direction determined by the guiding means 712,713. During the inclined displacement, the slideably engaged part of the linear actuators 111 displaces along the loose engagement slots 740 and the guiding pin 713 displaces along the path of the inclined guiding slot 712. The stationary part of the linear actuators 111 may be fixed to the hinge arm 707 and the loose engagement slot 740 may be formed in a side of the top mould 701. The guiding pin 713 may be part of the hinge arm 707 and the guiding slot 740 may be formed in a side of the top mould 701.

Figure 7B:
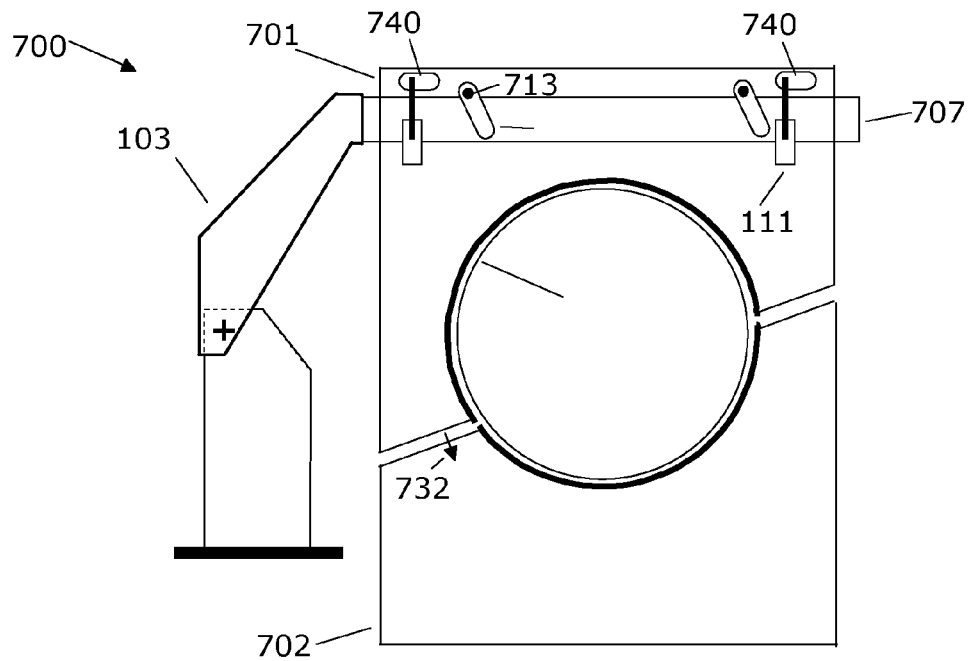

FIG. 7B shows the first mould 701 after it has been displaced along the angled direction 532 from the intermediate position in FIG. 7A to the final position in FIG. 5B.

The actuators 111 may be piston-type hydraulic actuators as illustrated. Other types of actuators comprise rack and pinion gears and lead screw actuators which may be engaged to the relevant parts of the mould system 100 via loose engagement means 540, 640 or via fixed or rotatable connectors.

The embodiments of FIGS. 5A-B, FIG. 6 and FIGS. 7A-B are equivalent to the embodiments of FIGS. 1, 2A-B and FIGS. 3A-B. Accordingly, the one or more actuators 111 are aligned with respect to the centre of gravity COG for each hinge unit 103 accordingly the principles described in connection with other embodiments. Although linear displacements and inclined linear displacements have been described in connection with FIGS. 5A-B, FIG. 6 and FIGS. 7A-B, the guiding means 112, 512, 712 and the actuators 111 and engagement means 540, 640, 740 may equally be configured for curved translations of the first mould.

All embodiments of the invention, i.e., embodiments described in relation to FIGS. 1, 2A-B, FIGS. 3A-B 5A-B, FIG. 6 and FIGS. 7A-B are equivalent with respect to the motional control of the moulds. Thus, the first mould 101, 501, 701 is initially rotated from an initial position where both surfaces 181, 182 of the respective first and second moulds faces upwards. The moulds are rotated about the hinge axis 105 to an intermediate position where the mould surface 181 of the first mould substantially faces the mould surface 182 of the second mould. Finally, the first mould is translated towards the second mould.

Figure 8A:
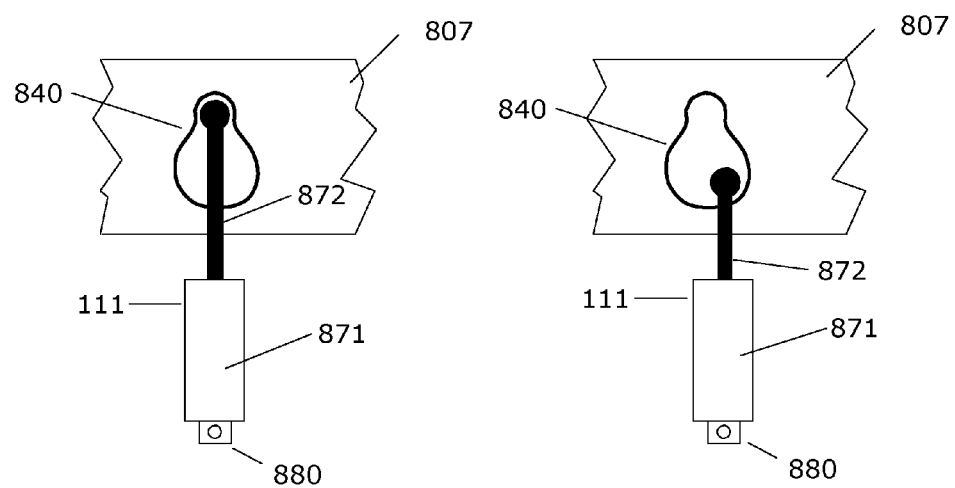
FIG. 8A shows an example of an engagement means enabling a sliding connection.
Figure 8B:
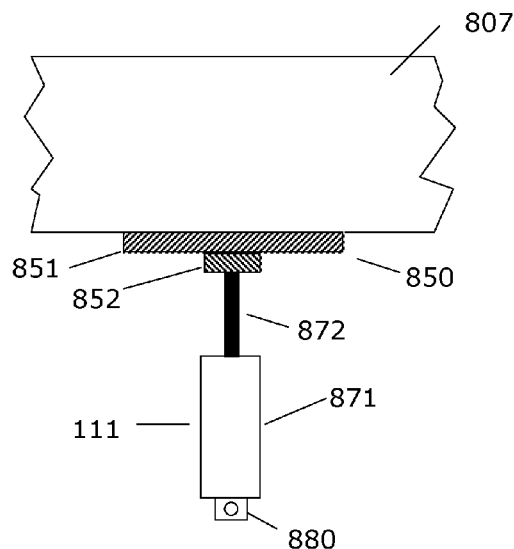
FIG. 8B shows an alternative example of an engagement means enabling a sliding connection.

FIGS. 8A-B shows alternative configurations of engagement means 540, 640, 740 which enables a positional degree of freedom of the actuator relative to the engagement means.

FIG. 8A shows a tear-drop-shaped loose engagement means 840, a linear displacement actuator 111 comprising a stationary motor part 871 and a displaceable piston 872 engaged in the engagement means. The engagement means 840 is formed in the hinge support arm 807 and the stationary part of the actuator 111 is fixed to some support, for example, the lower mould 102, via a fixation means 880. Thus, the configuration in FIG. 8A could be used in the mould system 100 of FIGS. 1, 2A and 2B, or could substitute the horizontal engagement slot 540 the mould system 500 of FIG. 5. Naturally, the actuator and engagement configuration of FIG. 8A could also be used in upper mould configurations similar to FIG. 3A-B and FIG. 7A-B, for example, by arranging the tear-drop engagement means 840 in the upper mould 101.

In FIG. 8A the illustration to the left shows the actuator 111 in a fully extended state where the piston 872 connects to the hinge unit 103 via the narrow part of the engagement means 840 so as the carry the load of the hinge unit 103 and the first mould 101. The illustration to the right shows the actuator in a retracted state where the piston 820 has disengaged from the engagement means 840 since the first mould is supported, for example, by the second mould 102. In addition to enabling disengagement of the actuator from the hinge unit 103, the tear drop engagement means 840 also enables a slideably connection since the end-portion of the piston 872 is able to displace horizontally relative to the engagement means as illustrated in the illustration to the right.

FIG. 8B shows an engagement means 850 comprised by one or two sliding pads 851, 852 for enabling a positional degree of freedom of the actuator 111 relative to one of the pads 851 of the engagement means 850. By fixing a sliding pad 851 to the support beam 807 so that a face of the sliding pad 851 faces the displacement actuator 111, for example, an end-portion of a piston 872, the actuator 111 is able to slide horizontally relative to the engagement means 850 and, thereby, the displaceable upper mould 101 is provided with a positional degree of freedom relative to the actuator 111. The actuator 111 may be configured to disengage from the engagement means when the piston 872 retracts sufficiently. The actuator 111 may be provided with a second sliding pad 852 arranged to face the first sliding pad 851 so as to reduce sliding friction between the pads. The pads may be made of polymeric materials or lubricated metal plates. The pads may be plane or curved in order to constrain the sliding.

Whereas the operation of the mould systems has been described in connection with a closing operation, the mould systems are also operable in an opening operation where the top mould is initially linearly displaced in a vertical or inclined direction from final position to the intermediate position and subsequently rotated about the hinge axis from the intermediate position the initial position. The opening operation may be performed after the blade halves 191, 192 have been joined.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

What is claimed is:

1. A method for manufacturing a wind turbine blade from two blade halves using a mould system comprising a first moveable mould and a second stationary mould with mould surfaces shaped according to the respective first and second halves of the blade, and comprising a hinge unit with a rotatably hinged arm connected to the first mould, the method comprising:
   rotating the first mould about a single hinge axis of the hinge arm from an initial position in which the mould surfaces of the first and second moulds each face upwardly to an intermediate position wherein the mould surface of the first mould substantially faces the mould surface of the second mould; and
   subsequent to rotating the first mould about the single hinge axis, translating the first mould relative to the intermediate position by using two actuators engaged with the hinge unit so that the hinge unit carries at least a fraction of the weight of the first mould at least during an initial period of the translation, wherein the two actuators are distributed in a direction substantially perpendicular to the single hinge axis, and wherein the two actuators are located on either side of a centre of gravity of a load comprising the weight of the first mould when the first mould is in the intermediate position, thereby compensating and minimizing torque loads on the two actuators about an axis parallel or substantially parallel with the single hinge axis,
   wherein each of the two actuators includes a first part coupled to the hinge arm and a second part coupled to the first moveable mould and moveable relative to the first part, and at least one of the first and second parts of each actuator engages with an engagement slot in the corresponding hinge arm or first moveable mould in order to provide a positional degree of freedom for the actuator in a transverse direction to the relative movement of the first and second parts of the actuator.

2. The method according to claim 1, wherein the two actuators are loaded by at least a fraction of the weight of the first mould during rotating the first mould about the single hinge axis from the initial position to the intermediate position.

3. The method according to claim 1, wherein the two actuators are rotated together with the first mould about the single hinge axis during the movement from the initial position to the intermediate position.

4. The method according to claim 1, further comprising:
   controlling a direction of the translation of the first mould with guiding means, the guiding means including a pin coupled to one of the hinge arm and the first moveable mould and a linear slot positioned in the other of the hinge arm and the first moveable mould, the pin sliding along the linear slot during translation of the first moveable mould.

5. The method according to claim 1, further comprising:
   situating the first mould in a final position relative to the second mould with locator pins.

6. The method according to claim 1, further comprising:
   disengaging the two actuators from the hinge unit when the first mould has been brought into a final position relative to the second mould.

7. The method according to claim 1, further comprising:
   linearly displacing the first mould in the same direction as a displaceable part of the two actuators.

8. The method according to claim 1, further comprising:
   displacing the first mould in a different direction than a displaceable part of the two actuators.

9. The method according to claim 1, wherein the first moveable mould includes the engagement slots and the second parts of the two actuators engage with the engagement slots to provide the positional degree of freedom between the two actuators and the first moveable mould.

10. A method for manufacturing a wind turbine blade from two blade halves using a mould system comprising a first moveable mould and a second stationary mould with mould surfaces shaped according to the respective first and second halves of the blade, and comprising a hinge unit with a rotatably hinged arm connected to the first mould, the method comprising:
   rotating the first mould about a single hinge axis of the hinge arm from an initial position in which the mould surfaces of the first and second moulds each face upwardly to an intermediate position wherein the mould surface of the first mould substantially faces the mould surface of the second mould;
   subsequent to rotating the first mould about the single hinge axis, translating the first mould relative to the intermediate position by using two actuators engaged with the hinge unit so that the hinge unit carries at least a fraction of the weight of the first mould at least during an initial period of the translation, wherein the two actuators are distributed in a direction substantially perpendicular to the single hinge axis, and wherein the two actuators are located on either side of a centre of gravity of a load comprising the weight of the first mould when the first mould is in the intermediate position, thereby compensating and minimizing torque loads on the two actuators about an axis parallel or substantially parallel with the single hinge axis; and controlling a direction of the translation of the first mould with guiding means, the guiding means including a pin coupled to one of the hinge arm and the first moveable mould and a linear slot positioned in the other of the hinge arm and the first moveable mould, the pin sliding along the linear slot during translation of the first moveable mould.

11. The method of claim 10, wherein each of the two actuators includes a first part coupled to the hinge arm and a second part coupled to the first moveable mould and moveable relative to the first part, and at least one of the first and second parts of each actuator engages with an engagement slot in the corresponding hinge arm or first moveable mould in order to provide a positional degree of freedom for the actuator in a transverse direction to the relative movement of the first and second parts of the actuator.

12. The method according to claim 11, wherein the first moveable mould includes the engagement slots and the second parts of the two actuators engage with the engagement slots to provide the positional degree of freedom between the two actuators and the first moveable mould.

* * * * *